(12) United States Patent
Lax (10) Patent No.: US 9,745,052 B2
(45) Date of Patent: Aug. 29, 2017

(54) DETERMINING ENHANCED OPERATING STATE FOR AIRCRAFT

(71) Applicant: GE Aviation Systems LLC, Grand Rapids, MI (US)

(72) Inventor: David Michael Lax, Grand Rapids, MI (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 0 days.

(21) Appl. No.: 14/927,667

(22) Filed: Oct. 30, 2015

(65) Prior Publication Data

US 2017/0121011 A1 May 4, 2017

(51) Int. Cl.
| | |
|---|---|
| *G05D 1/00* | (2006.01) |
| *G05B 13/02* | (2006.01) |
| *B64C 19/00* | (2006.01) |
| *G05D 1/04* | (2006.01) |

(52) U.S. Cl.
CPC ........... *B64C 19/00* (2013.01); *G05D 1/0005* (2013.01); *G05D 1/042* (2013.01)

(58) Field of Classification Search
USPC ................................................. 701/4; 700/29
See application file for complete search history.

(56) References Cited

U.S. PATENT DOCUMENTS

| | | | | |
|---|---|---|---|---|
| 4,312,041 | A | | 1/1982 | DeJong |
| 5,335,164 | A | * | 8/1994 | Gough, Jr. ........... G05B 13/024 700/29 |
| 5,457,634 | A | | 10/1995 | Chakravarty |
| 5,615,118 | A | | 3/1997 | Frank |
| 5,687,077 | A | * | 11/1997 | Gough, Jr. ........... G05B 13/042 700/29 |
| 5,908,176 | A | | 6/1999 | Gilyard |
| 6,334,344 | B1 | | 1/2002 | Bonhoure et al. |
| 7,031,811 | B2 | | 4/2006 | Parsons et al. |

(Continued)

FOREIGN PATENT DOCUMENTS

| | | |
|---|---|---|
| EP | 2 873 836 A1 | 5/2015 |
| GB | 2 124 776 A | 2/1984 |

(Continued)

OTHER PUBLICATIONS

Combined Search and Examination Report issued in connection with corresponding GB Application No. 1617857.6 dated Mar. 23, 2017.

*Primary Examiner* — Tyler Paige
(74) *Attorney, Agent, or Firm* — GE Global Patent Operation; William S. Munnerlyn (57) ABSTRACT

Systems and methods for determining an operating state for an aircraft are provided. In one example, a method can include accessing, by one or more computing devices located on an aircraft, a database of precomputed operating parameters associated with aircraft trim determined in a priori process. The method can further include receiving a real time measurement of one or more dyanamic parameters associated with the aircraft. An aircraft trim parameter can be determined from the precomputed operating parameters independent of the real time measurements. The method can further include determining an enhanced operating state for the aircraft based at least in part on the aircraft trim parameter and the real time measurement of the one or more dynamic operating parameters.

19 Claims, 4 Drawing Sheets

(56) References Cited

U.S. PATENT DOCUMENTS

| | | |
|---|---|---|
| 8,396,612 B2 | 3/2013 | Fernandez-Ramos |
| 8,467,918 B2 | 6/2013 | Lieu |
| 8,509,968 B1 | 8/2013 | Saccone et al. |
| 2004/0224577 A1* | 11/2004 | Kaji ............... G05B 13/0275 440/1 |
| 2009/0077945 A1* | 3/2009 | Cornwell ............ F02C 7/232 60/39.281 |
| 2009/0277185 A1* | 11/2009 | Goeke ............... F02C 9/263 60/776 |
| 2010/0198433 A1 | 8/2010 | Fortier et al. |
| 2011/0137496 A1* | 6/2011 | Everett ............. B64C 13/08 701/3 |
| 2011/0202251 A1* | 8/2011 | Luppold ............ F02C 9/42 701/100 |
| 2013/0204469 A1 | 8/2013 | Horsager et al. |
| 2013/0268315 A1* | 10/2013 | Cotton ............ G06Q 30/0201 705/7.29 |
| 2014/0277853 A1 | 9/2014 | Castillo-Effen et al. |

FOREIGN PATENT DOCUMENTS

| | | |
|---|---|---|
| GB | 2518893 A | 4/2015 |
| GB | 2537743 A | 10/2016 |

\* cited by examiner

DETERMINING ENHANCED OPERATING STATE FOR AIRCRAFT

FIELD OF THE INVENTION

The present subject matter relates generally to determining an operating state for an aircraft.

BACKGROUND OF THE INVENTION

Avionics systems located on aircraft can be used to determine optimal or enhanced operating states of the aircraft based on various operating conditions and other parameters. For instance, data indicative of engine operating modes, flight path information, engine parameters (e.g., throttle setting, fuel flow, etc.), altitude, trim conditions, weight, and other operating parameters can be used to determine operating state variables, such as speed and/or altitude of an aircraft, to reduce the cost of conducting a flight. The cost of a flight can be defined, for instance, in terms of fuel consumption and/or time to achieve a flight range associated with the flight. The aircraft can be controlled in accordance with the determined operating variables to increase efficiency.

Due to the complexity of the optimization algorithms used to determine the enhanced operating states of the aircraft, it can be difficult to perform the calculations in real time using a computing system located onboard an aircraft. For instance, one example optimization algorithm can include reducing an objective function through an iterative process. Each iteration can require function evaluation. In some cases, solving for aircraft trim state can be required to perform the optimization. Solving for aircraft trim state can itself be an iterative computation that is very computationally expensive. Nesting the iterations to solve for aircraft trim and to perform the optimization can increase the computation time by orders of magnitude and can be impractical to perform using onboard avionics systems.

Some approaches to aircraft performance optimization include performing the calculations a priori in an offline (not in the embedded avionics system) computational environment and tabulating the results. During flight, the avionics system can access the tabulated results and look up a desired operating state (e.g., speed and altitude) based on an operating point of the aircraft (e.g., based on a current altitude and weight of the aircraft). A drawback of this approach is that assumptions must be made for certain operating parameters, such as engine parameters and flight path parameters, as opposed to using real time measurements of actual operating parameters during flight. This can cause potential inaccuracies in the operating state determined by the optimization algorithm, leading to increased costs (e.g., in terms of fuel consumption and/or flight time) for a flight.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed a computer-implemented method of determining an operating state for an aircraft. The method includes accessing, by one or more computing devices located on an aircraft, a database of precomputed operating parameters associated with aircraft trim. The precomputed operating parameters can be determined in an a priori process. The method can further include receiving, by the one or more computing devices, a real time measurement of one or more dynamic operating parameters associated with the aircraft. The method can further include determining, by the one or more computing devices, an aircraft trim operating parameter from the precomputed operating parameters based on data indicative of an operating point of the aircraft. The aircraft trim operating parameters can be determined independent of the real time measurement of the one or more dynamic parameters. The method can further include determining, by the one or more computing devices, an operating state for the aircraft during flight of the aircraft based at least in part on the aircraft trim operating parameters and the real time measurement of the one or more dynamic operating parameters. The method can further include outputting, by the one or more computing devices, the operating state for control of the aircraft.

Other example aspects of the present disclosure are directed to systems, methods, aircraft, avionics systems, devices, non-transitory computer-readable media for determining an enhanced operating state for an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended FIGS., in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for determining an enhanced operating state of an aircraft, for instance, to increase performance of an aircraft (e.g., reduce costs) during a flight. Modern avionics systems perform optimization of operating states through pre-computed approaches that make assumptions about certain aircraft operating states and dynamic operating parameters in order to limit the memory and computing resources required to determine the enhanced operating state. A pre-computed approach can be necessary in some cases to meet timing requirements in avionics systems.

The systems and methods according to example aspects of the present disclosure can decouple the process for determining an enhanced operating state into an a priori portion and an onboard processing portion. An a priori portion is a portion that can be performed without requiring real time measurements, for instance, prior to operation of the aircraft. In some embodiments, the a priori portion can be performed offline by a computing system remote from the onboard computing system associated with the aircraft. The onboard processing portion can be performed in response to real time measurements of dynamic operating parameters during operation of the aircraft (e.g., during flight). The real time measurements obtained during the onboard processing portion can remove assumptions about operating modes and efficiencies from the pre-computed portion. Replacing these assumptions with actual or measured data allows for a more accurate solution, yielding potentially more optimal solutions and reduced direct operating cost. Performing a portion of the enhancement process in an a priori manner can maintain a computationally feasible solution.

For example, in one embodiment, computationally complex problems associated with aerodynamics of the aircraft, such as solving for aircraft trim parameters, can be implemented in an a priori process. The aircraft trim parameters can be required thrusts for the aircraft to overcome aerodynamic drag conditions to maintain flight of the aircraft at various operating points of the aircraft. The different operating points of the aircraft can be defined based on altitude, weight, ambient temperature and/or speed of the aircraft. The aircraft trim parameters for the different operating points can be tabulated and provided to an onboard computing system in a tabulated form (e.g., as a lookup table) or a function.

Solving for aircraft trim parameters can be computationally intensive but can also be performed independent of real time measurements of dynamic parameters that may change during flight of the aircraft. For instance, the required thrust to maintain balance with aerodynamic drag can be computed independently of engine health, engine mode, throttle, or other dynamic parameters. As a result, solving for aircraft trim parameters in an a priori process can preserve computing resources necessary to determine an enhanced operating state of the aircraft and/or other flight functions.

According to particular aspects of the present disclosure, real time measurements of dynamic inputs measured during flight, such as engine parameters, flight path data, etc. can be used to determine an optimal or enhanced operating state for the aircraft. More particularly, the real time measurements can be used in conjunction with the aircraft trim parameters determined in the a priori process to determine an enhanced operating state for the aircraft using an optimization routine.

For example, in one implementation, required thrust(s) determined from the tabulated precomputed aircraft trim parameters can be provided to an engine model. In addition, data measured in real time such as various engine parameters (e.g., throttle setting, current fuel flow, engine health data, atmospheric data, engine mode data) and flight path data can be provided to the engine model. The engine model can be used to determine fuel flow for the aircraft. An enhanced operating state for the aircraft can be determined using an optimization routine that reduces a cost parameter determined, for instance, based on the fuel flow. As used herein, an enhanced operating state is an operating state determined using example aspects of the present disclosure. For instance, an enhanced operating state can be an operating state that reduces a cost of operation of the aircraft relative to a previous operating state.

The enhanced operating state can include one or more operating state variables, such as a desired speed and/or altitude for flying the aircraft that reduces costs (e.g., reduces fuel flow). The aircraft can then be controlled in accordance with the enhanced operating state. In this way, real time measurements obtained during flight can be used in determining an enhanced operating state for the aircraft, potentially leading to improved efficiency and reduced operating cost.

In this way, the systems and methods according to example aspects of the present disclosure can have a technical effect of accounting for real time measured operational parameters, such as measured engine and flight plan parameters, to customize an operating state enhancement process for an individual flight of an aircraft. By using measured values instead of assumed values for the dynamic parameters as would be the case in a completely offline process, the operating state enhancement process can be tailored to individual flights and can thus be more accurate. This can lead to reduced costs through fuel savings, time savings, and other parameters. Moreover, by breaking the enhancement process into an a priori process for aircraft trim and other aerodynamic problems and an onboard process for real time measurements of operating parameters, a practical solution is provided for determining an enhanced operating state using computing resources available in avionics systems.

Figure 1:
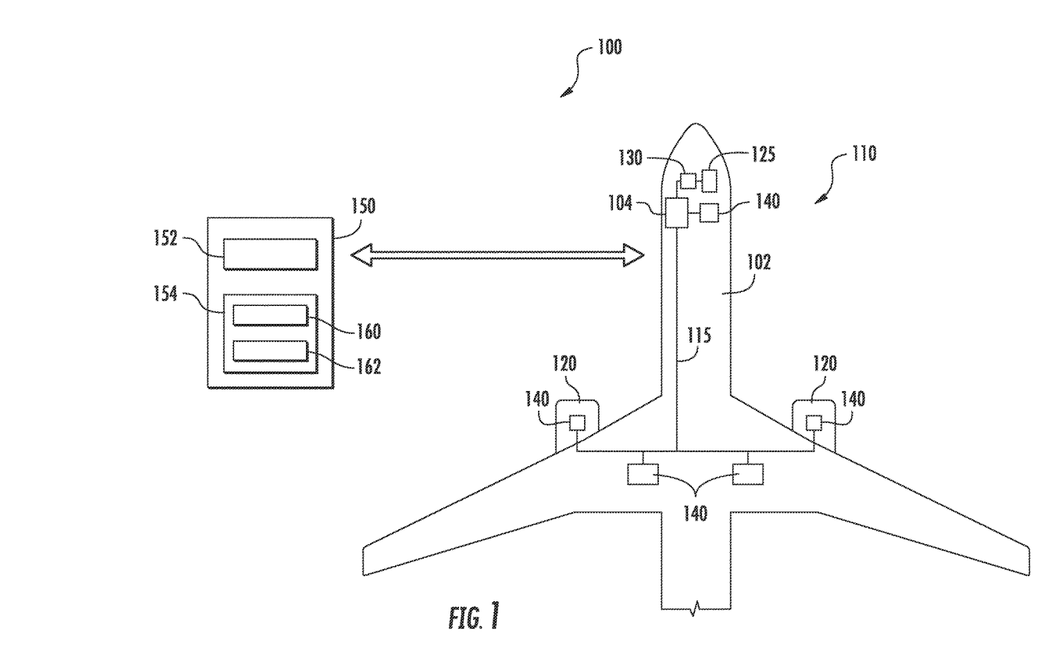
FIG. 1 depicts an overview of an example system according to example embodiments of the present disclosure.

FIG. 1 depicts an example system 100 for determining an enhanced operating state of for an aircraft 102 according to example embodiments of the present disclosure. As shown, the system 100 includes an onboard computing system 110 that is located on the aircraft 102. The system 100 system can also include a computing system 150. In some embodiments, the computing system 150 can be used to perform an a priori portion of an operating state enhancement process according to example embodiments of the present disclosure.

As shown in FIG. 1, the onboard computing system 110 can include one or more computing devices 104 that can be associated with, for instance, an avionics system. The computing device(s) 104 can be coupled to a variety of systems on the aircraft 102 over a communications network 115. The communications network 115 can include a data bus or combination of wired and/or wireless communication links.

The computing device 104 can be in communication with a display system 125 including one or more display devices that can be configured to display or otherwise provide information generated or received by the system 100 to operators of the aircraft 102. The display system 125 can include a primary flight display, a multipurpose control display unit, or other suitable flight display commonly included within a cockpit of the aircraft 102. By way of non-limiting example, the display system 125 can be used for displaying flight information such as airspeed, altitude, attitude, and bearing of the aircraft 102, as well as the enhanced operating state and/or associated cost information.

The computing device 104 can also be in communication with a flight control computer 130. The flight control computer 130 can, among other things, automate the tasks of piloting and tracking the flight plan of the aircraft 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aircraft 130. The flight control computer 130 is illustrated as being separate from computing device(s) 104. Those of ordinary skill in the art, using the disclosures provided herein, will understand that the flight control computer 130 can also be included with or implemented by the computing device(s) 104.

The computing device(s) 104 can also be in communication with various aircraft systems 140, such as aircraft systems 140 associated with one or more propulsion engines 120 and other components of the aircraft 102. The aircraft systems 140 can include, for instance, digital control systems, throttle systems, inertial reference systems, flight instrument systems, engine control systems, auxiliary power systems, fuel monitoring system, engine vibration monitoring systems, communications systems, flap control systems, flight data acquisition systems, and other systems. The aircraft systems 140 can provide various operating parameters to the computing device(s) 104 for use in determining an operating state of aircraft 102 according to example embodiments of the present disclosure.

For instance, one or more of the aircraft systems 120 can provide flight path data and engine parameter data to the computing device 104 for use in determining an operating state of the aircraft 102. Flight path data can include information such as, but not limited to, altitude, speed, bearing, location and/or other information associated with a flight path of the aircraft. Engine parameter data can include information such as, but not limited to, engine mode data, engine health data, atmospheric data, throttle information, fuel flow, fuel consumption, and other information.

Figure 2:
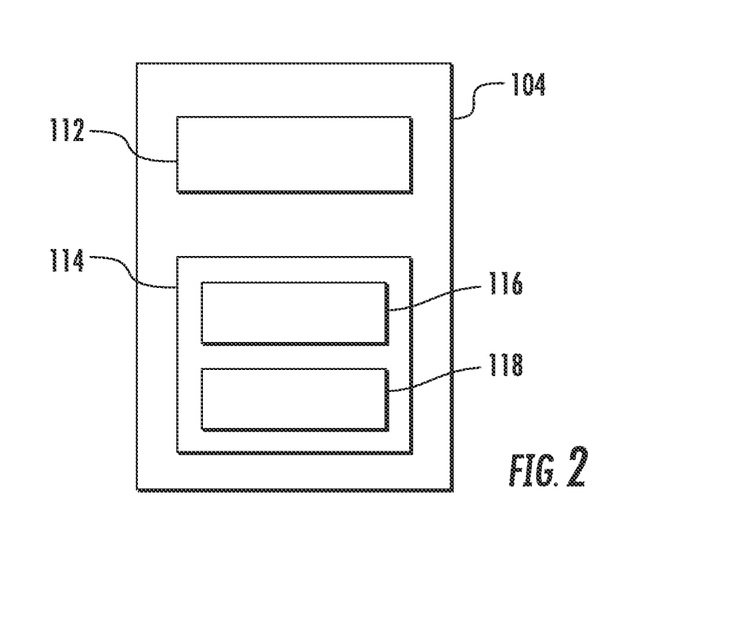
FIG. 2 depicts components of an example computing system implemented onboard an aircraft according to example embodiments of the present disclosure.

FIG. 2 depicts various components of the computing device(s) 104 according to example embodiments of the present disclosure. As shown, the computing device(s) 104 can include one or more processors 112 and one or more memory devices 114. The one or more processors 112 can include any suitable processing device, such as a microprocessor, microcontroller, integrated circuit, logic device, or other suitable processing device. The one or more memory devices 114 can include on or more computer-readable media, including, but not limited to, non-transitory computer-readable media, RAM, ROM, hard drives, flash drives, or other memory devices.

The one or more memory devices 114 can store information accessible by the one or more processors 112, including computer-readable instructions 116 that can be executed by the one or more processors 112. The instructions 116 can be any set of instructions that when executed by the one or more processors 112, cause the one or more processors 112 to perform operations. The instructions 116 can be software written in any suitable programming language or can be implemented in hardware. In some embodiments, the instructions 116 can be executed by the one or more processors 112 to cause the one or more processors to perform operations, such as the operations for determining an operating state for an aircraft described with reference to FIG. 3.

Referring to FIG. 2, the memory devices 114 can further store data 118 that can be accessed by the processors 112. The data 118 can include, for instance, data used to determine an enhanced operating state for an aircraft. For example, the data 118 can include tabulated precomputed operating parameters (e.g., aircraft trim parameters) determined, for instance, by the computing system 150 of FIG. 1. The data 118 can also include data associated with models used to perform aircraft performance enhancement processes according to example embodiments of the present disclosure.

Referring to FIG. 1, the system 100 further includes computing system 150. Computing system 150 can be located at remote location that is separated and remote from the onboard computing system 110 located onboard the aircraft. Similar to the computing device(s) 104, the computing system 150 can include one or more processors 152 and one or more memory devices 154. The one or more memory devices 154 can store computer-readable instructions 160 that when executed by the one or more processors 152 cause the one or more processors 152 to perform operations, such as determining precomputed operating parameters (e.g. aircraft trim parameters) for use by the onboard computing system 110. For instance, the instructions 160 can be implemented by the one or more processors 154 to execute an aircraft trim solver that can access an aerodynamic model and determined required thrusts to maintain aircraft trim for a plurality of operating points for an aircraft. The memory devices 154 can further store data 162. The data 162 can include, for instance, required thrusts for a plurality of different operating points tabulated into, for instance, a lookup table or function correlating required thrusts with different operating points.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 3:
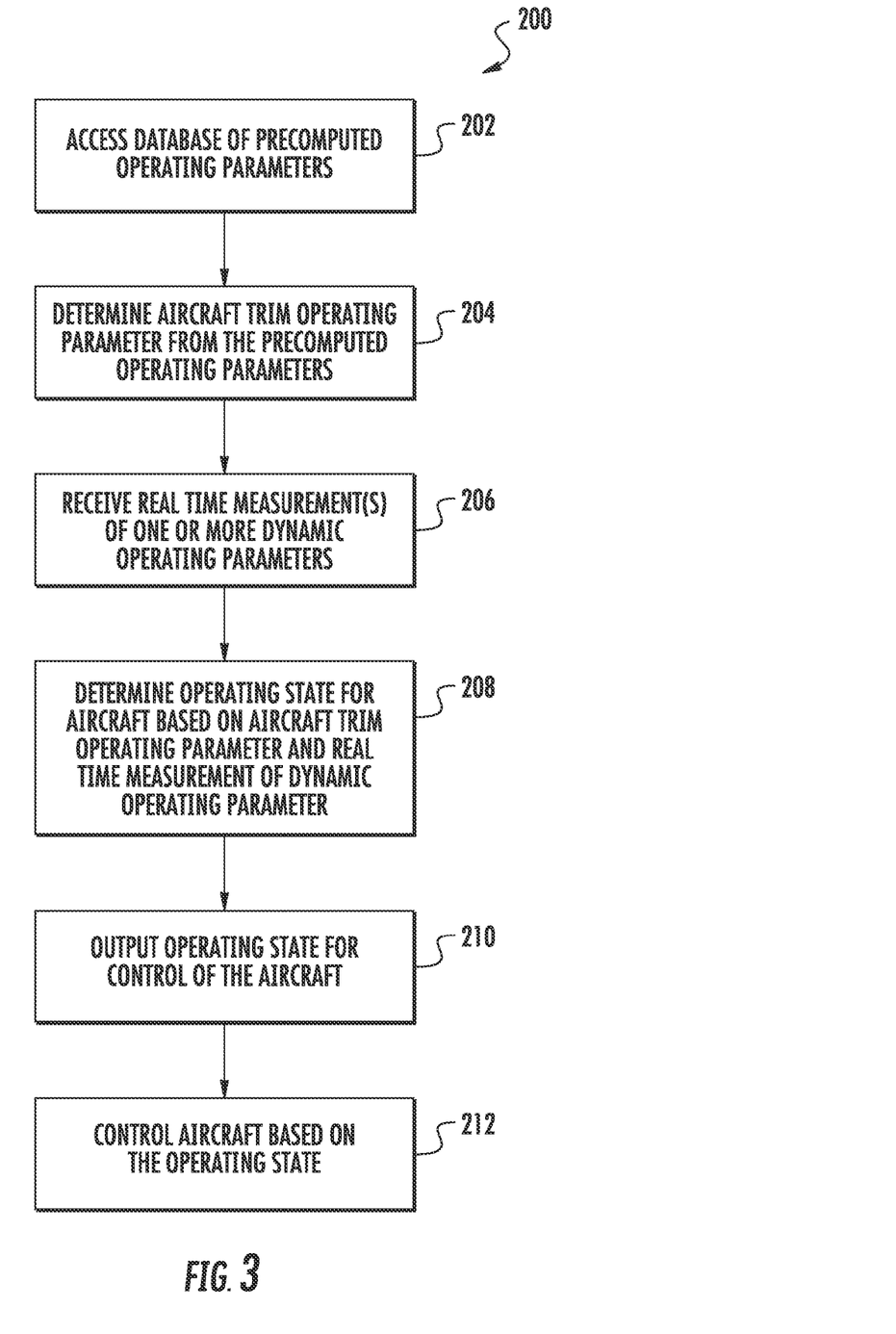
FIG. 3 depicts a flow diagram of an example method according to example embodiments of the present disclosure.

FIG. 3 depicts a flow diagram of an example method (200) of determining an enhanced operating state for an aircraft according to example embodiments of the present disclosure. FIG. 2 can be implemented by one or more computing devices, such as the onboard computing device (s) 104 depicted in FIG. 1. In addition, FIG. 3 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (202), the method can include accessing a database of precomputed operating parameters. The precomputed operating parameters can be determined, for instance in an a priori process by computing system 150 of FIG. 1 or other suitable system. Alternatively, the precomputed operating parameters can be determined in an a priori process by onboard computing system 110, for instance, prior to operation of the aircraft and/or initiation of the onboard processing portion based on real time measurements of an operating state enhancement process. The precomputed operating parameters can be tabulated, for instance, into a lookup table or function for use by the onboard computing system 110 in determining an enhanced operating state for the aircraft. The precomputed operating parameters can be, for instance, required thrusts determined by an aircraft trim solver for a plurality of operating points (e.g., defined based on differing altitudes, weights, ambient temperatures and speeds) of the aircraft.

Figure 4:
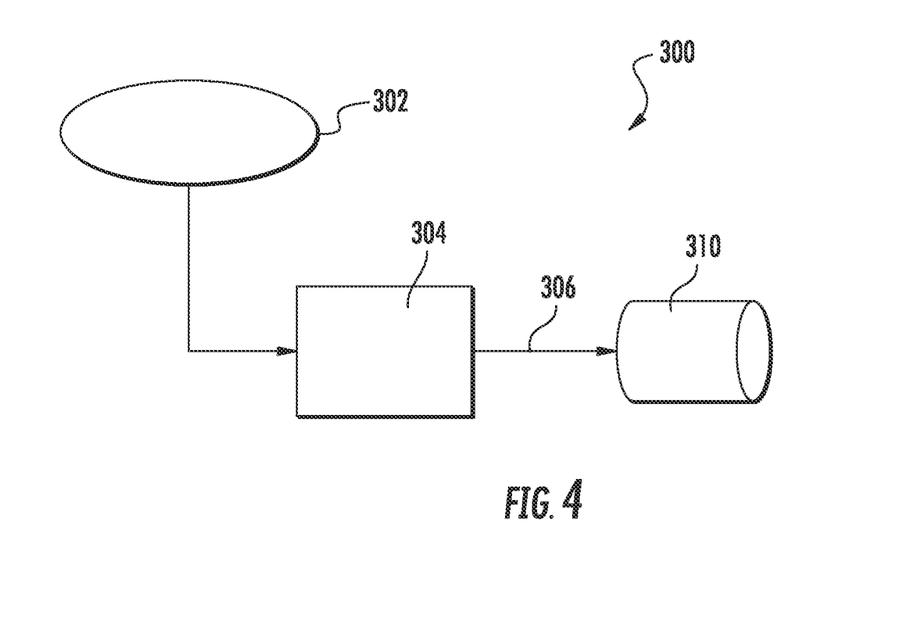
FIG. 4 depicts an a priori portion of an operating state enhancement process according to example embodiments of the present disclosure.

FIG. 4 depicts an overview of an a priori portion 300 of an operating state enhancement process according to example embodiments of the present disclosure that can be used to determine the precomputed operating parameters. The offline portion 300 can be implemented by the remote computing system 150 of FIG. 1 or other suitable computing system. Referring to FIG. 4, an aircraft trim solver 304 can access an aerodynamic model to solve for a required thrust 306 to maintain aircraft trim (e.g., balance aerodynamic drag) for each of a plurality of different operating points 302. Each operating point 302 can be associated with one or more of a different altitude, weight, ambient temperature and/or speed of the aircraft. The required thrust 306 for each operating point 302 can be tabulated into a data structure 310 of tabulated required thrusts. The data structure 310 can be, for instance, a lookup table or function correlating each operating point 302 with its corresponding required thrust 306.

Referring back to FIG. 3 at (204), the method can include determining an aircraft trim operating parameter from the plurality of precomputed operating parameters. For example, a candidate operating point for the aircraft can be used to determine a first operating parameter corresponding to the candidate operating point from the plurality of precomputed operating parameters.

Figure 5:
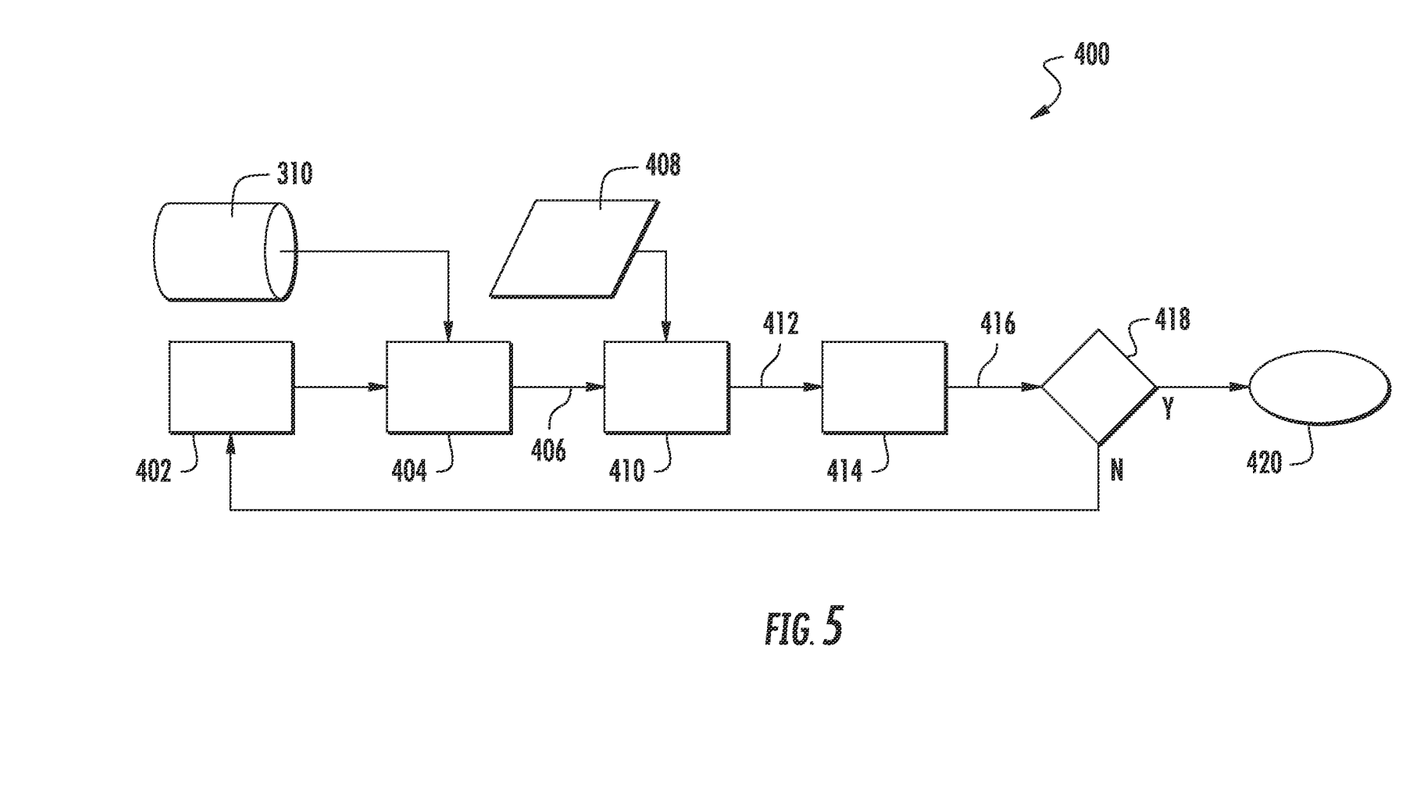
FIG. 5 depicts an onboard portion of an operating state enhancement process according to example embodiments of the present disclosure.

For example, FIG. 5 depicts an overview of an onboard portion 400 of an operating state enhancement process according to example embodiments of the present disclosure. The onboard portion 400 can be implemented by the onboard computing system 110 located on the aircraft 102 of FIG. 1. As shown in FIG. 5, the data structure 310 of tabulated required thrusts can be accessed by a lookup/interpolation process 404 to determine a required thrust 406 or other aircraft trim parameter (e.g. angle of attack or other data that can be converted to drag and/or required thrust) for a candidate operating point 402.

The candidate operating point 402 can be an operating point (e.g., defined based on altitude, weight, and speed) selected during the performance of an optimization process. For instance, the candidate operating point 402 can be an intermediate operating point selected during an iterative aircraft enhancement process. For instance, the aircraft performance enhancement process can perform an optimization routine that iteratively computes cost parameters for a plurality of different candidate operating points 402. The candidate operating points 402 can be determined by selectively adjusting the altitude, weight, and/or speed of a previous operating point used by the optimization routine. A variety of methods for selecting candidate operating points 402 can be used during the aircraft performance enhancement process without deviating from the scope of the present disclosure.

Referring to FIG. 3 at (206), the method can include receiving real time measurements of one or more dynamic operating parameters associated with the aircraft. The second operating parameters can be dynamic operating parameters that may change during flight. For instance, the second operating parameters can include flight path data (e.g., altitude, speed, bearing, location) and engine parameters (e.g., throttle setting, current fuel flow, fuel consumption, etc.). The measurements can be received, for instance, from one or more aircraft systems 140 at the computing device(s) 104 of FIG. 1.

At (208), the method includes determining an enhanced operating state for the aircraft based at least in part on the aircraft trim operating parameter and the real time measurement of the one or more dynamic operating parameters. For instance, an optimization routine can be performed to identify an enhanced operating state that reduces a cost parameter determined based at least in part on the aircraft trim dynamic operating parameter and the real time measurement of the one or more second operating parameters. The operating state can include one or more operating state variables. The operating state variables can include, for instance, an altitude and/or speed of the aircraft.

For example, referring to FIG. 5, the required thrust 406 and the received measurements 408 of engine parameters and flight path data can be provided to an engine model 410. The engine model 410 can correlate a performance value (e.g., fuel flow) of the aircraft with the required thrust 406 and engine parameters and flight path data. The engine model 410 can be stored in a variety of suitable forms, such as a function, lookup table, equation, statistical model, or other suitable form.

The engine model 410 can be evaluated using the required thrust 406 and the measurements 408 to obtain a fuel flow 412. As demonstrated in FIG. 5, the fuel flow 412 can be provided to a cost function 414 that can compute a cost parameter 416 based on the fuel flow 412. In some embodiments, the cost parameter can be computed as direct operating costs as a function of fuel flow and groundspeed. At 418, it can be determined whether the cost parameter 416 is reduced relative to a previous cost parameter. If not, the process can continue to the next candidate operating point 402 where the onboard portion 400 is repeated for the next candidate operating point 402. When the cost parameter 416 is reduced relative to a previous cost parameter the candidate operating point can be determined as an enhanced operating state 420 for the aircraft.

Referring to FIG. 3 at (210), once an enhanced operating state has been determined, the enhanced operating state can be output using a suitable output device for control of the aircraft. For instance, the operating state can be output by the computing device(s) 104 to the display system 125 for display to operators of the aircraft 102 of FIG. 1. Audible or other notifications of the enhanced operating state can be provided to operators of the aircraft. In some embodiments, the enhanced operating state can be output to the flight control computer 130.

Referring to FIG. 3 at (212), the method can include controlling the aircraft based on the enhanced operating state. For instance, in one embodiment, an operator of the aircraft 102 of FIG. 1 can manually control the aircraft in response to the enhanced operating state presented on the display system 125 of the aircraft 102 (e.g., control the aircraft to fly at the altitude and/or speed specified in the enhanced operating state). In another embodiment, the flight control computer 130 can automatically control the aircraft 102 (e.g. using autopilot) in accordance with the enhanced operating state (e.g., control the aircraft to fly at the altitude and/or speed specified in the enhanced operating state).

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of determining an operating state for an aircraft, the method comprising:
   A) accessing, by one or more computing devices located on an aircraft, a database of precomputed operating parameters associated with aircraft trim, the precomputed operating parameters determined without real time measurements;
   B) receiving, by the one or more computing devices, a real time measurement of one or more dynamic operating parameters associated with the aircraft flying at a current operating state having a current cost parameter;
   C) determining, by the one or more computing devices, an aircraft trim operating parameter from the precomputed operating parameters based on data indicative of a candidate operating point of the aircraft, the aircraft trim operating parameter determined independent of the real time measurement of the one or more dynamic parameters;
   D) determining, by the one or more computing devices, a candidate enhanced operating state for the aircraft during flight of the aircraft having a cost parameter determined by at least the aircraft trim operating parameter and the real time measurement of the one or more dynamic operating parameters;
   E) comparing the cost parameter for the candidate enhanced operating state with the current cost parameter of the current operating state; and
   F) when the cost parameter for the candidate enhanced operating state is reduced compared with the current cost parameter, operating the aircraft in accordance with the candidate enhanced operating state for the control of the aircraft, and when the cost parameter for the candidate enhanced operating state is not reduced compared with the current cost parameter, iterating through steps C)-F) with a new candidate operating point of the aircraft.

2. The method of claim 1, wherein the precomputed operating parameters comprise required thrusts to operate the aircraft at one or more candidate operating points.

3. The method of claim 2, wherein the required thrusts are tabulated in a lookup table or defined as a function of the current operating state.

4. The method of claim 2, wherein the aircraft trim operating parameter comprises a required thrust for operating the aircraft at the candidate operating point.

5. The method of claim 4, wherein the data indicative of the candidate operating point comprises data indicative of an altitude, weight, ambient temperature, or speed associated with the aircraft.

6. The method of claim 1, wherein determining, by the one or more computing devices, the candidate enhanced operating state for the aircraft comprises:
   accessing, by the one or more computing devices, a model correlating a performance attribute associated with the aircraft with the aircraft trim operating parameter and the one or more dynamic operating parameters; and
   determining, by the one or more computing devices, the candidate enhanced operating state that reduces the cost parameter determined based on the performance attribute associated with the aircraft.

7. The method of claim 6, wherein the performance attribute comprises data indicative of fuel flow associated with the aircraft.

8. The method of claim 7, wherein the model comprises an engine model correlating a required thrust determined by an aircraft trim solver and one or more dynamic parameters with fuel flow for the aircraft.

9. The method of claim 8, wherein the one or more measured dynamic parameters comprise one or more of a throttle setting, current fuel flow, flight path data, engine health data, atmospheric data, or engine mode data.

10. The method of claim 1, wherein the candidate enhanced operating state comprises one or more operating state variables, the operating state variables comprising a speed or altitude of the aircraft.

11. The method of claim 1, further comprising provided the candidate enhanced operating state for display on one or more display devices.

12. The method of claim 1, wherein operating the aircraft comprises controlling the aircraft with a flight control computer in accordance with the operating state.

13. An avionics system for determining an operating state for an aircraft, the avionics system comprising:
   one or more processors and one or more memory devices located on an aircraft, the one or more memory devices storing instructions that when executed by the one or more processors cause the one or more processors to perform operations, the operations comprising:
      accessing a database of precomputed operating parameters associated with aircraft trim, the precomputed operating parameters determined without real time measurements;
      receiving real time measurement of one or more dynamic operating parameters associated with the aircraft flying at a current operating state;
      determining an aircraft trim operating parameter associated with aircraft trim from the precomputed operating parameters based on data indicative of a candidate operating point of the aircraft, the aircraft trim operating parameter determined independent of the real time measurement of the one or more second operating parameters;
      determining a cost parameter based on the aircraft trim operating parameter, the candidate operating point of the aircraft, and the real time measurement of the one or more dynamic operating parameters; and
      when the cost parameter is reduced compared with the operating state of the aircraft, automatically operating the aircraft in accordance with the aircraft trim operating parameter and the candidate operating point for control of the aircraft.

14. The avionics system of claim 13, wherein the precomputed operating parameters comprise required thrusts determined using an aircraft trim solver to operate the aircraft at one or more operating points of the aircraft.

15. The avionics system of claim 14, wherein the aircraft trim operating parameter comprises a required thrust for operating the aircraft at the candidate operating point.

16. The avionics system of claim 13, wherein the operation of determining the cost parameter comprises:
    accessing a model correlating a performance attribute associated with the aircraft with the aircraft trim operating parameter and the one or more dynamic operating parameters; and
    iterating through the determining an aircraft trim operating parameter to identify a candidate operating point that reduces the cost parameter determined based on the performance attribute associated with the aircraft.

17. A computer-implemented method of determining one or more operating state variables for an aircraft based one measured operating conditions, comprising:
    accessing, by one or more computing devices located on an aircraft, a lookup table correlating required thrusts with operating points of the aircraft, the lookup table generated by an airframe trim solver without real time measurements;
    determining, by the one or more computing devices, a required thrust parameter associated with the aircraft based on data indicative of a candidate operating point of the aircraft, the data indicative of the candidate operating point comprising data indicative of at least one of an altitude, weight, ambient temperature, or speed associated with the aircraft;
    receiving, by the one or more computing devices, data indicative of one or more measured operating parameters measured during a flight of the aircraft, the one or more measured operating parameters comprising at least one of a throttle setting, a current fuel flow, flight path data, or engine mode data;
    determining, by the one or more computing devices, a candidate enhanced operating state for the aircraft having a cost parameter based at least in part on the required thrust parameter and the data indicative of one or more measured operating parameters; and
    when the cost parameter for the candidate enhanced operating state for the aircraft is reduced compared with the flight of the aircraft operating the aircraft, by the one or more computing devices, in accordance with the candidate enhanced operating state.

18. The method of claim 17, wherein determining, by the one or more computing devices, the candidate enhanced operating state for the aircraft comprises:
    accessing, by the one or more computing devices, an engine model correlating fuel flow associated with the aircraft with the required thrust parameter and measured operating parameters; and
    determining, by the one or more computing devices, the candidate enhanced operating state that reduces the cost parameter determined based at least in part on the fuel flow.

19. The method of claim 18, wherein the candidate enhanced operating state comprises one or more operating state variables, the operating state variables comprising at least one of a speed or an altitude of the aircraft.

* * * * *